(12) United States Patent
Kalandek et al.

(10) Patent No.: US 9,527,466 B2
(45) Date of Patent: Dec. 27, 2016

(54) OFFSET IMPACT COUNTERMEASURES

(71) Applicant: Key Safety Systems, Inc., Sterling Heights, MI (US)

(72) Inventors: Bruce A Kalandek, Dearborn, MI (US); David R Arnold, Macomb, MI (US); Joseph Massa, Rochester Hills, MI (US); Mutaz Shkoukani, Macomb, MI (US); Martin Specht, Feldafing (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 14/415,617

(22) PCT Filed: Jul. 18, 2013

(86) PCT No.: PCT/US2013/050991
§ 371 (c)(1),
(2) Date: Jan. 19, 2015

(87) PCT Pub. No.: WO2014/015094
PCT Pub. Date: Jan. 23, 2014

(65) Prior Publication Data
US 2015/0175110 A1    Jun. 25, 2015

Related U.S. Application Data

(60) Provisional application No. 61/674,242, filed on Jul. 20, 2012.

(51) Int. Cl.
*B60R 21/00* (2006.01)
*B60R 19/00* (2006.01)
*B60R 21/16* (2006.01)

(52) U.S. Cl.
CPC ............ *B60R 21/00* (2013.01); *B60R 19/00* (2013.01); *B60R 21/16* (2013.01);
(Continued)

(58) Field of Classification Search
CPC ......... B60R 19/00; B60R 21/00; B60R 21/16; B60R 2019/007; B60R 2021/0023; B60R 2021/0025
See application file for complete search history.

(56) References Cited

U.S. PATENT DOCUMENTS 6,755,453 B2 *   6/2004   Kellas ................... B60R 19/42
                                                           188/377
7,185,728 B2 *   3/2007   Makita .................. B60R 19/205
                                                           180/274
(Continued)

FOREIGN PATENT DOCUMENTS

EP    0978442 A1    2/2000
EP    1582414 A2    10/2005

*Primary Examiner* — Darlene P Condra
(74) *Attorney, Agent, or Firm* — Markell Seitzman

(57) ABSTRACT

A ramp deflector mechanism (50) for attachment to a vehicle frame (20) has a metal housing (52) having a first wall or plate (54), a second wall or plate (56), a hinge (58) and an articulated third wall or plate (60); an inflatable member (70) situated in the housing (52); an inflator (72) operatively connected between the first wall or plate (54) and the inflatable member (70); and wherein the inflation of the inflation member (70) causes the articulated wall (60) to rotate outwardly to absorb crash energy and slow down the accident.

14 Claims, 6 Drawing Sheets

(52) U.S. Cl.
CPC . *B60R 2019/007* (2013.01); *B60R 2021/0023* (2013.01); *B60R 2021/0025* (2013.01)

(56) References Cited

U.S. PATENT DOCUMENTS

| | | | | |
|---|---|---|---|---|
| 7,556,118 | B2 * | 7/2009 | Huh | B60R 21/0136 |
| | | | | 180/268 |
| 7,784,817 | B2 * | 8/2010 | Choi | B60R 19/205 |
| | | | | 180/274 |
| 7,819,218 | B2 * | 10/2010 | Eichberger | B60R 19/00 |
| | | | | 180/274 |
| 7,926,847 | B2 * | 4/2011 | Auer | B60R 19/54 |
| | | | | 280/784 |
| 7,988,183 | B1 * | 8/2011 | Okamoto | B60R 21/36 |
| | | | | 280/728.2 |
| 8,353,380 | B2 * | 1/2013 | Schonberger | B60R 19/16 |
| | | | | 180/274 |
| 9,004,216 | B1 * | 4/2015 | Baccouche | B60R 21/36 |
| | | | | 180/274 |
| 2005/0218696 | A1 * | 10/2005 | Aase | B60R 19/00 |
| | | | | 296/187.02 |
| 2007/0057490 | A1 * | 3/2007 | Deflorimonte | B60R 21/36 |
| | | | | 280/730.1 |
| 2009/0102167 | A1 * | 4/2009 | Kitte | B60R 21/233 |
| | | | | 280/728.2 |
| 2009/0152041 | A1 * | 6/2009 | Kim | B60R 21/36 |
| | | | | 180/274 |
| 2009/0306857 | A1 * | 12/2009 | Katz | B60R 21/0136 |
| | | | | 701/45 |
| 2013/0278013 | A1 * | 10/2013 | Baccouche | B60R 19/00 |
| | | | | 296/187.1 |
| 2015/0142271 | A1 * | 5/2015 | Cuddihy | G01D 5/3537 |
| | | | | 701/45 |

* cited by examiner

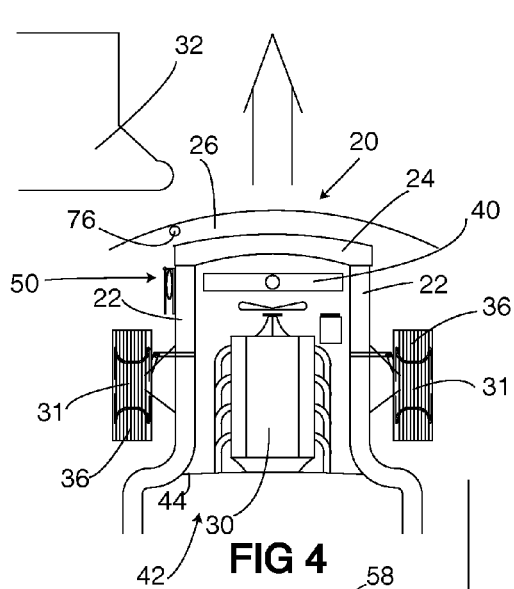
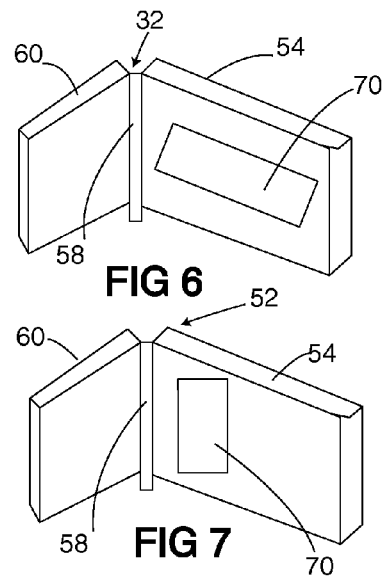
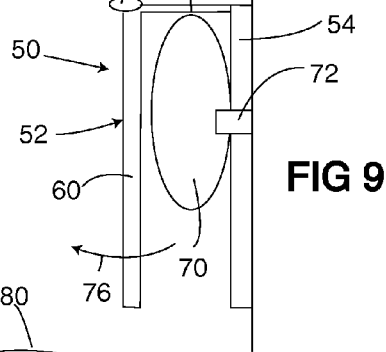
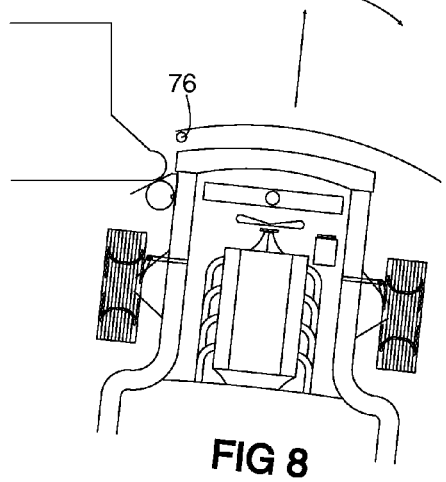
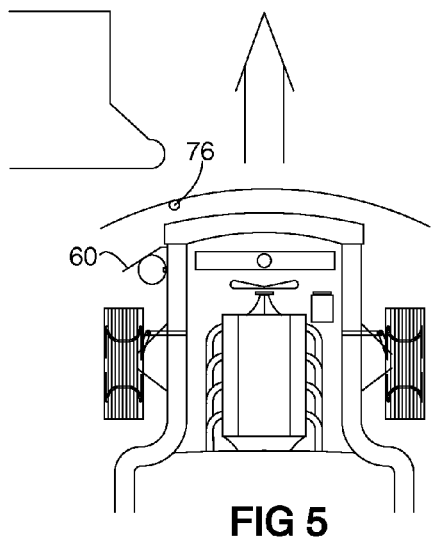

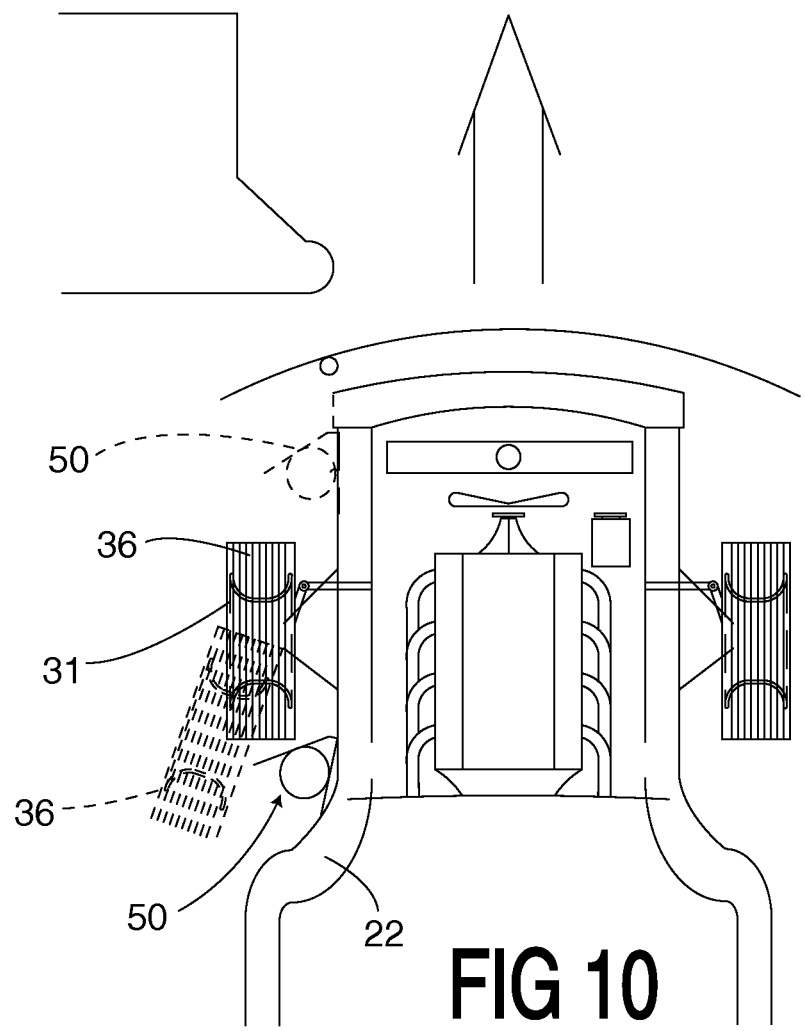

OFFSET IMPACT COUNTERMEASURES

BACKGROUND AND SUMMARY OF THE INVENTION

The present invention relates to vehicle countermeasure initiatives capable of increasing vehicle performance during barrier tests or actual crash conditions relative to small overlap collisions.

FIG. 1 is representative of the construction of a modern day vehicle 18 having a frame 20. The frame 20 comprises longitudinal rails 22 and a crossbar or bumper 24. The bumper is covered by fascia 26. As can be seen from FIG. 1 the bumper does not extend across the entire width of the vehicle. Occasionally the bumper ends substantially at the point of contact with the longitudinal rail or there is just a minor amount of extension of the bumper past the longitudinal rail. Portions of the vehicle to the right or to the left of the bumper are less protected than is the center portion of the vehicle. FIGS. 2 and 3 represent a class of vehicle accident where only the outside corner of the vehicle 18 is initially involved in an accident with the corner of a second vehicle or with an obstruction such as a post or pole or other barrier 32. This type of accident is referred to as a small overlap type accident.

It is an object of the present invention to provide solutions to mediate this type of collision.

BRIEF DESCRIPTION OF THE DRAWINGS

FIG. 4 shows a first embodiment of the invention.

FIG. 5 illustrates the first embodiment in an activated condition.

FIGS. 6 and 7 illustrate all the orientations of an airbag.

FIG. 8 diagrammatically illustrates the beneficial effects of the invention.

FIG. 9 is an enlarged view of a deflector mechanism.

FIG. 10 shows another embodiment of the invention.

DETAILED DESCRIPTION OF THE DRAWINGS

Figure 1:
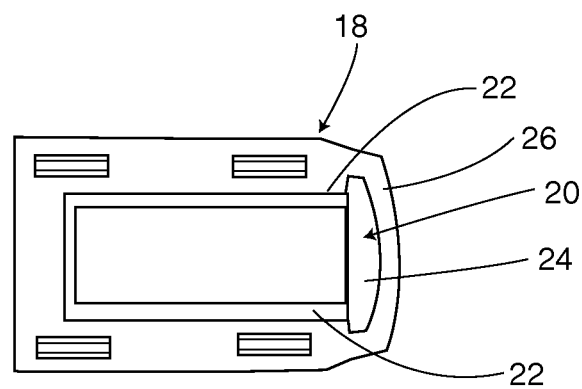
FIGS. 1-3 show various examples of small offset or small overlap vehicle accidents.
Figure 2:
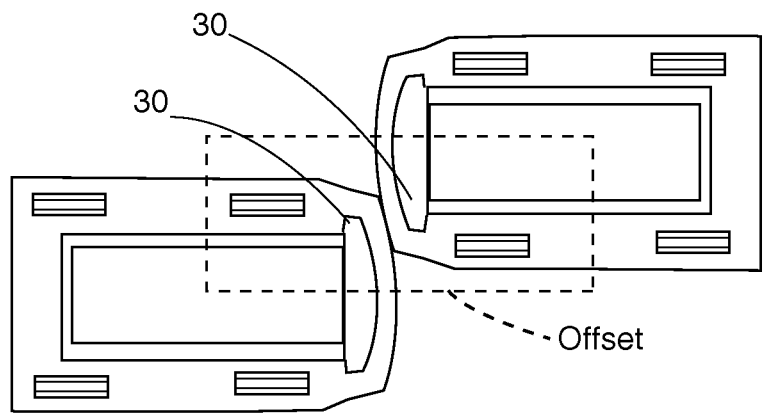
Figure 3:
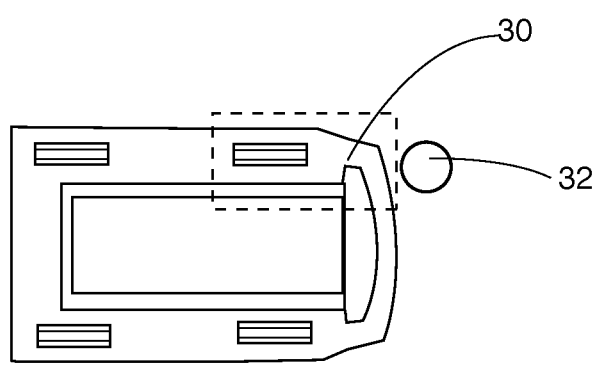

Reference is made to FIGS. 4-9 which illustrate the first embodiment of the present invention. FIG. 4 illustrates frame 20 having side rails 22, and a bumper 24 which is covered in the fascia 26. The various other vehicle 18 components are illustrated such as the engine 30, wheels 31 and tires 36 and the radiator 40. The passenger compartment is generally identified by region 42 behind the firewall 44. Numeral 32 generally illustrates a barrier or oncoming vehicle which impacts or is impacted by the vehicle 18 in a small overlap crash situation.

The first embodiment of the invention comprises a ramp deflector 50 comprising a metal housing 52 comprising a first wall or plate 54 second wall or plate 56, and a hinge 58 and an articulated third wall or plate 60. In another embodiment in FIGS. 6 and 7 the housing 52 includes two hinged walls 54 and 60, separated by hinge 58. The entire housing may be covered by a rupturable dirt or dust shield which is not illustrated. Situated within the housing is an inflatable member or object including a bag, hose or tube 70. An inflator 72 capable of generating inflation gas is operatively connected between the wall or plate 54 and the airbag. The system comprising the ramp deflector further includes a crash sensor 76 situated in the offset zone of the vehicle. Another benefit of using the inflatable member 70 is that it will absorb crash energy and slow down the accident.

At the inception of the collision, sensor 76 generates a signal which causes the activation of inflator 72, which in turn causes the inflation of the inflatable member 70. Inflation of member 70 causes wall or plate 60 to rotate outwardly to its activated position as indicated by arrow 76 to the position illustrated in FIG. 5. As the accident progresses the introduction of the barrier/vehicle 32 increases until the barrier engages the angled wall or plate 60. This engagement against the angled surface of plate 60 causes a change in the vehicle trajectory as the vehicle rotates and moves laterally away from the barrier/vehicle 32. As the accident further progresses vehicle 18 will move sufficiently sideways so that the occupant, in this case the driver, avoids direct impact with the vehicle/barrier 32.

Reference is briefly made to FIGS. 6 and 7 which illustrate possible orientations of the inflatable member upon plate 54. It is envisioned the inflatable member 70 may be oblong in shape and may be secured to plate 54 in a general horizontal orientation or in a vertical orientation.

Reference is briefly made to FIG. 10 which illustrates another embodiment of the invention. In this embodiment a second deflector mechanism 50 is secured to rail 22 behind the wheel 31. This second deflector mechanism 50 can be used independently or the vehicle can use both deflector mechanisms. It has been shown that in many small offset accidents the front wheel and tire are often dislodged. By positioning a second deflector mechanism 50 behind the tire/wheel this second deflector mechanism will redirect the tire/wheel away from the passenger compartment and in view of the resilient properties of the inflatable member 70 further absorb energy and slow down the accident. The operation of the second deflector mechanism 50 is the same as that previously described.

Figure 13:
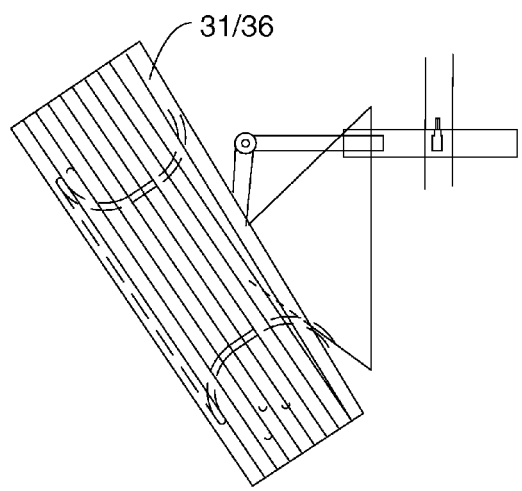
FIGS. 11-14 show a further embodiment of the invention.
Figure 12:
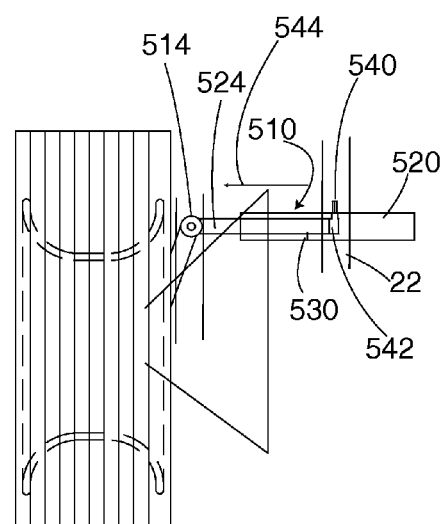
Figure 14:
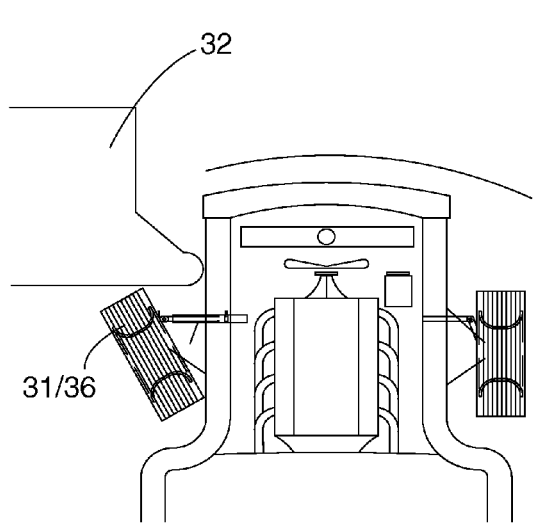
Figure 11:
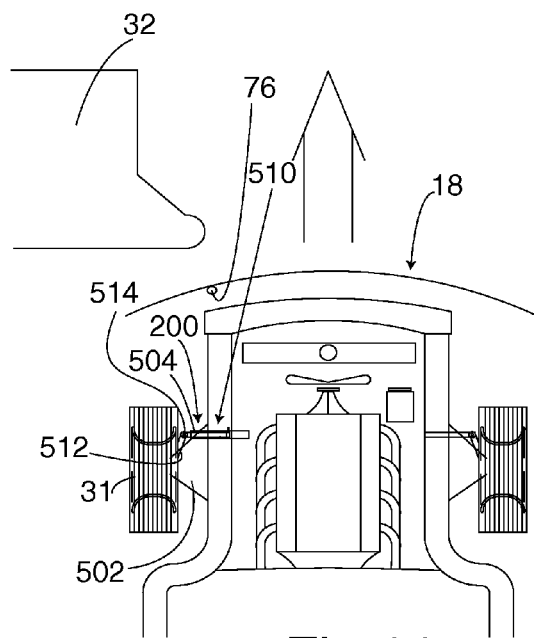

Reference is made to FIGS. 11-14 which show a further embodiment of the invention. This alternate embodiment comprises a tie-rod extender 200. In normal operation the wheel 31 is rotationally secured to the frame by various control arms 502 and 504. The steering componentry of the vehicle includes a tie rod 510 and the steering link 512 joined at a pivot or steering knuckle 514. FIG. 11 further shows the vehicle 18 in a condition immediately prior to an offset collision. The tie-rod 510 of the present invention includes a fixed the cylinder 520 secured to a vehicle component such as the frame rail 22 and an extendable link 524 which is attached to the steering knuckle or hinge 514. The extendable link or piston 524 is secured during normal driving situations to the fixed cylinder 520 by a breakable link 530 such as a pin or other breakable mechanism. The extendable member, pin and cylinder are designed to carry the normal forces during vehicular operation. As the vehicle 18 hits barrier 32, sensor 76 generates a signal that activates an ignition mechanism 540 which generates gas that is communicated to a pressure chamber 542 as shown in FIG. 12. The expanding gas pushes the expandable link outwardly in the direction of arrow 544 while breaking the pin 530 to permanently and outwardly rotate the tire/wheel 31/36 as shown in FIG. 13. FIG. 14 shows the interrelationship between the oncoming barrier or vehicle as it impacts the rotated wheel/tire. By configuring the wheel/tire in this manner the tire is used as a shock absorbing element between the barrier and vehicle 18, thereby lessening vehicle damage and occupant injury.

Figure 16:
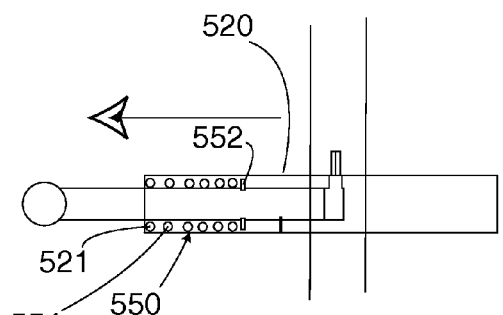
FIGS. 15 and 16 show another embodiment of the invention.
Figure 15:
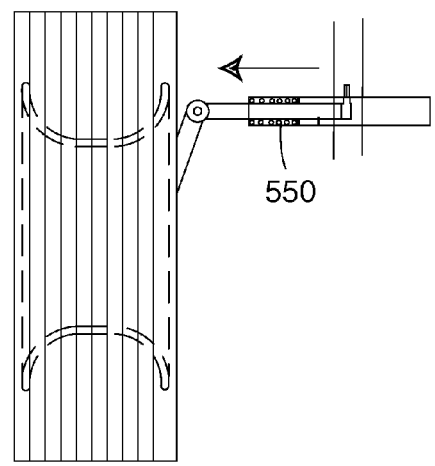

Reference is briefly made to FIGS. 15 and 16 which illustrate an alternate embodiment of the invention. The embodiment in FIGS. 15 and 16 is substantially the same as that illustrated in FIG. 11 with the exception of the inclusion of an energy absorbing member 550 included within the cylinder 520. More particularly in the illustrated embodiment the energy absorbing member is a spring 554 which is located between an end 521 of the cylinder and the flange 552 carried by the piston 524. During the accident as the wheel impacts the barrier/vehicle it will be moved further away from the vehicle 18 and some of that crash energy will be dissipated by spring 554.

Figure 18:
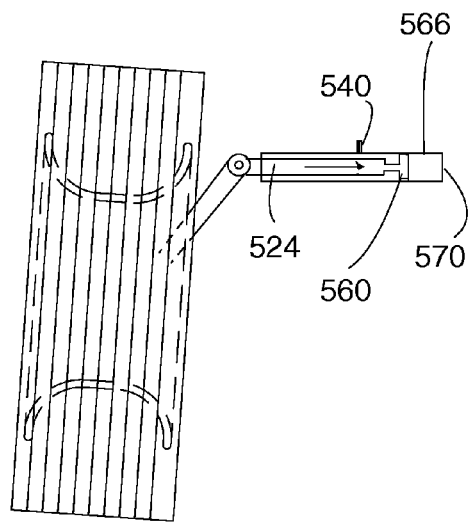
FIGS. 17 and 18 show a further embodiment of the invention.
Figure 17:
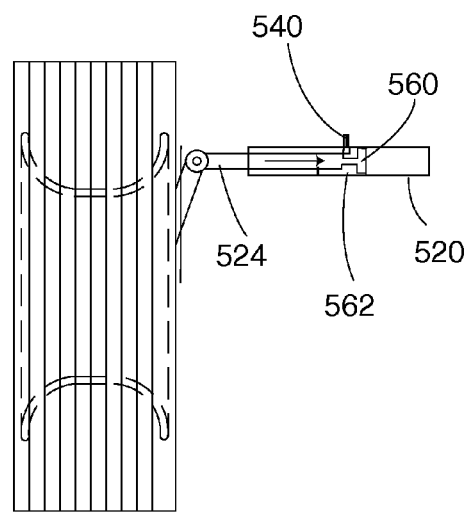

Reference is made to FIGS. 17 and 18 which illustrate a further embodiment of the invention. The operation of this embodiment is similar to the embodiment illustrated in FIGS. 11 and 12. In this embodiment piston 524 includes a flange 560 and, in conjunction with cylinder 520, defines a pressure chamber 562; ignition of mechanism 540 causes piston 524 to move to the right relative to FIGS. 17 and 18 turning the illustrated tire/wheel to the right. FIG. 18 illustrates the piston after it has moved into the cylinder causing the rotation of the wheel/tire. An optional energy absorbing mechanism such as springs 566 can be situated between flange 560 and end 570 of the cylinder.

Figure 19:
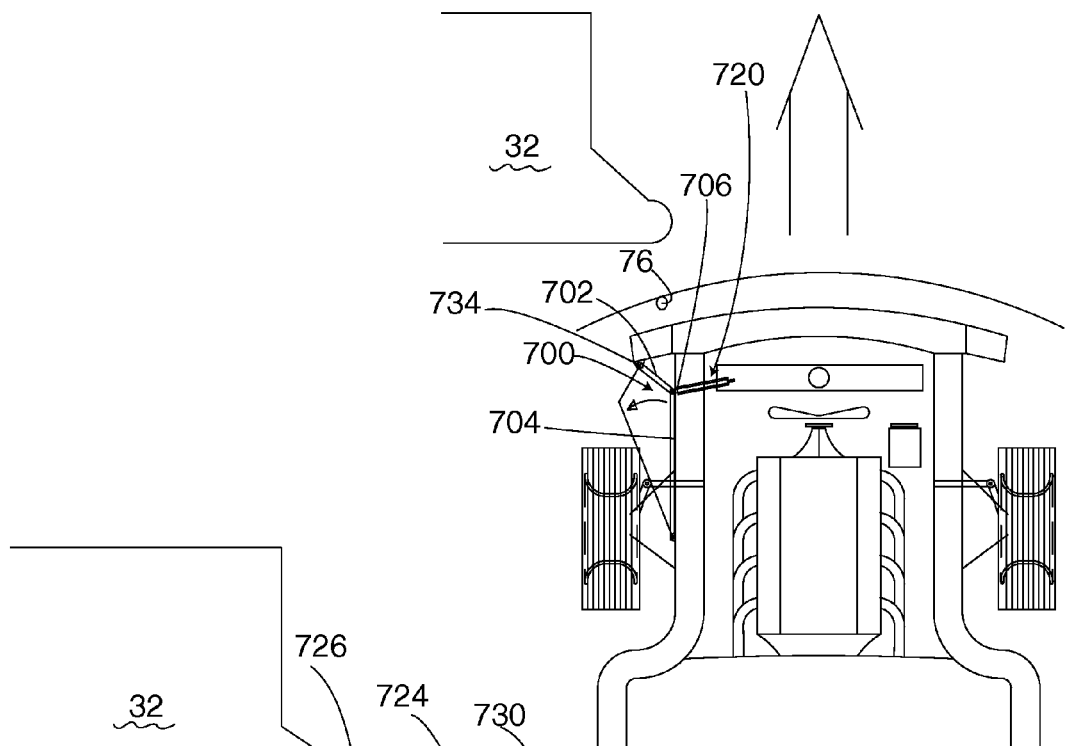
FIGS. 19 and 20 show another embodiment of the invention.
Figure 20:
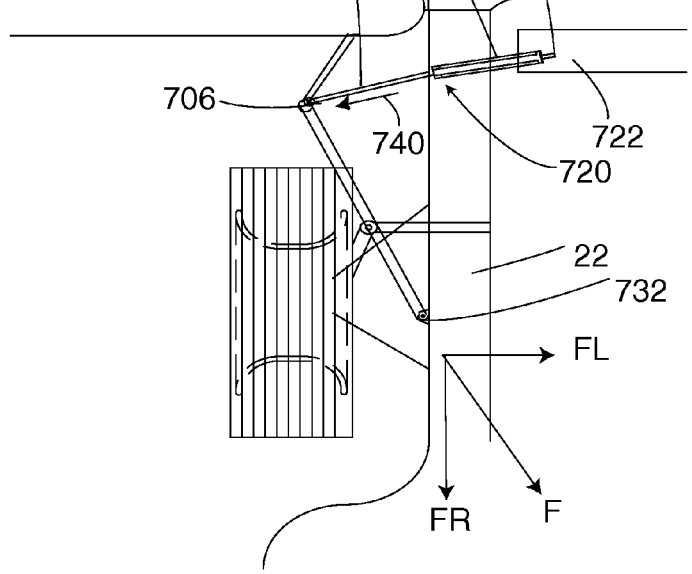

FIGS. 19 and 20 show a further embodiment of the invention. FIG. 19 illustrates in another diverter mechanism generally shown by 700. The diverter mechanism includes a first rotatable link 702 and a second rotatable link 704. The links 702 and 704 are pivotably joined at a hinge 706. A pyrotechnic actuator 720 is connected between a portion of the vehicle 722 and hinge 706. The pyrotechnic actuator includes a housing or cylinder 724 and a piston 726 movable to an actuated position. Actuator 720 includes an ignition mechanism 730 of known variety which generates products of combustion within cylinder 724 causing outward movement of the piston 726. The piston and housing include a one-way clutch type of device which is not illustrated but which prevents the piston from being pushed back into the housing. Link 704 is hinged to frame 22 at hinge 732 and link 702 is pivotably attached to the bumper at hinge 734.

Upon impact of the vehicle with barrier or vehicle 32 a signal is generated by sensor 76 causing the activation of actuator 730. Activation of actuator 730 moves the piston outwardly along the direction of arrow 740 moving the links to their activated positions as illustrated in FIG. 20. This action also locks the piston and links in place in their activated positions. As the accident progresses and the barrier/vehicle 32 makes contact with various vehicle structures it will load links 702, 704 and piston 726, generating a resultant force F on the vehicle frame with a lateral force component $F_L$ causing the vehicle to move laterally away from the encroaching barrier. $F_R$ represents the rearward component of force.

Many changes and modifications in the above-described embodiment of the invention can, of course, be carried out without departing from the scope thereof. Accordingly, that scope is intended to be limited only by the scope of the appended claims.

What is claimed is:

1. A ramp deflector mechanism (50) for attachment to a vehicle frame (20) comprises:
    a metal housing (52) having a first wall or plate (54), a second wall or plate (56), a hinge (58) and an articulated third wall or plate (60);
    an inflatable member (70) situated in the housing (52);
    an inflator (72) operatively connected between the first wall or plate (54) and the inflatable member (70);
    a collision sensor (76), at the inception of a collision the collision sensor (76) generates a signal to activate the inflator (72), wherein the collision sensor (76) is situated in an offset zone of the vehicle (18) at the left or right of a bumper (24) offset from a center of the vehicle;
    wherein the inflation of the inflation member (70) causes the articulated wall (60) to rotate outwardly to absorb crash energy and slow down the accident; and
    wherein the deflector mechanism (50) a center of the vehicle to a rail (22) of the frame (20) of a vehicle (18), the mechanism (50) when activated aligned in front of a front wheel (31).

2. The ramp deflector mechanism (50) of claim 1 wherein the inflatable member (70) further comprises an airbag (70) or a hose (70) or a tube (70).

3. The ramp deflector mechanism (50) of claim 2 wherein the inflatable member (70) is oblong in shape.

4. The ramp deflector mechanism (50) of claim 3 wherein the inflatable member (70) is secured to the first plate (54).

5. The ramp deflector mechanism (50) of claim 4 wherein the inflatable member (70) is secured in a horizontal orientation.

6. The ramp deflector mechanism (50) of claim 4 wherein the inflatable member 70 is secured in a vertical orientation.

7. A ramp deflector mechanism (50) for attachment to a vehicle frame (20) comprises:
    a metal housing (52) having a first wall or plate (54), a second wall or plate (56), a hinge (58) and an articulated third wall or plate (60);
    an inflatable member (70) situated in the housing (52);
    an inflator (72) operatively connected between the first wall or plate (54) and the inflatable member (70);

a collision sensor (76), at the inception of a collision the collision sensor (76) generates a signal to activate the inflator (72), wherein the collision sensor (76) is situated in an offset zone of the vehicle (18) at the left or right of a bumper (24) offset from a center of the vehicle;
    wherein the inflation of the inflation member (70) causes the articulated wall (60) to rotate outwardly to absorb crash energy and slow down the accident; and
wherein the deflector mechanism (50) is secured to a rail (22) of the frame (20) of the vehicle (18) the mechanism (50) when activated aligned behind a front wheel (31) to redirect the wheel away from a passenger compartment (42) of the vehicle (18).

8. The ramp deflector mechanism (50) of claim 7 wherein the inflatable member (70) further comprises an airbag (70) or a hose (70) or a tube (70).

9. The ramp deflector mechanism (50) of claim 8 wherein the inflatable member (70) is oblong in shape.

10. The ramp deflector mechanism (50) of claim 9 wherein the inflatable member (70) is secured to the first plate (54).

11. The ramp deflector mechanism (50) of claim 10 wherein the inflatable member (70) is secured in a horizontal orientation.

12. The ramp deflector mechanism (50) of claim 10 wherein the inflatable member (70) is secured in a vertical orientation.

13. The ramp deflector mechanism (50) of claim 7 wherein two deflector mechanisms (50) are mounted on the rail (22) of the vehicle frame (20) of the vehicle (18), one mechanism (50) when activated aligned in front of a front wheel (31) and another one mechanism when activated aligned behind the front wheel (31).

14. A ramp deflector mechanism (50) for attachment to a vehicle frame (20) comprises:
   a metal housing (52) having a first wall or plate (54), a second wall or plate (56), a hinge (58) and an articulated third wall or plate (60);
   an inflatable member (70) situated in the housing (52);
   an inflator (72) operatively connected between the first wall or plate (54) and the inflatable member (70);
   a collision sensor (76), at the inception of a collision the collision sensor (76) generates a signal to activate the inflator (72), wherein the collision sensor (76) is situated in an offset zone of the vehicle (18) at the left or right of a bumper (24) offset from a center of the vehicle;
   wherein the inflation of the inflation member (70) causes the articulated wall (60) to rotate outwardly to absorb crash energy and slow down the accident; and
wherein two deflector mechanisms (50) are mounted on the rail (22) of the vehicle frame (20) of the vehicle (18), one mechanism (50) aligned when activated in front of a front wheel (31) and one mechanism aligned when activated behind the front wheel (31).

* * * * *